United States Patent
Mukherjee et al.

(10) Patent No.: US 12,277,593 B2
(45) Date of Patent: *Apr. 15, 2025

(54) VOICE-ENABLED RECIPE SELECTION

(71) Applicant: Walmart Apollo, LLC, Bentonville, AR (US)

(72) Inventors: Snehasish Mukherjee, Santa Clara, CA (US); Deepa Mohan, San Jose, CA (US); Haoxuan Chen, Mountain View, CA (US); Phani Ram Sayapaneni, Sunnyvale, CA (US); Ghodratollah Aalipour Hafshejani, San Jose, CA (US); Shankara Bhargava Subramanya, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,839

(22) Filed: Apr. 22, 2024

(65) Prior Publication Data

US 2024/0273609 A1 Aug. 15, 2024

Related U.S. Application Data

(63) Continuation of application No. 16/779,535, filed on Jan. 31, 2020, now Pat. No. 11,966,964.

(51) Int. Cl.
*G06Q 30/0601* (2023.01)
*G06F 16/22* (2019.01)
(Continued)

(52) U.S. Cl.
CPC ......... *G06Q 30/0633* (2013.01); *G06F 16/22* (2019.01); *G06N 3/042* (2023.01);
(Continued)

(58) Field of Classification Search
CPC ........... G06Q 30/0633; G06Q 30/0603; G06Q 30/0619; G06F 16/22; G06N 3/0427;
(Continued)

(56) References Cited

U.S. PATENT DOCUMENTS

| 8,234,119 B2 | 7/2012 | Dhawan et al. |
| 2002/0143550 A1 | 10/2002 | Nakatsuyama |

(Continued)

*Primary Examiner* — Bhavesh M Mehta
*Assistant Examiner* — Edward Tracy, Jr.
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed configured to run on the one or more processors, cause the one or more processors to and perform operations: receiving a command from a user; transforming, using a trained machined learning model, the command by detecting an intent to add one or more recipe ingredients; determining a recipe from a set of recipes; determining one or more items and one or more quantities or sizes of the one or more items; selecting a respective quantity or size from quantities or sizes of available items of the one or more items, wherein the respective quantity or size, as selected, is overruled when a different quantity or size preference is indicated by the user; and automatically adding to the shopping cart the one or more items. Other embodiments are described.

20 Claims, 8 Drawing Sheets

(51) Int. Cl.
*G06N 3/042* (2023.01)
*G06N 3/044* (2023.01)
*G06N 3/08* (2023.01)
*G10L 15/16* (2006.01)
*G10L 15/18* (2013.01)
*G10L 15/22* (2006.01)

(52) U.S. Cl.
CPC .............. *G06N 3/044* (2023.01); *G06N 3/08* (2013.01); *G06Q 30/0603* (2013.01); *G06Q 30/0619* (2013.01); *G10L 15/16* (2013.01); *G10L 15/1815* (2013.01); *G10L 15/22* (2013.01); *G10L 2015/223* (2013.01)

(58) Field of Classification Search
CPC ........ G06N 3/0445; G06N 3/08; G10L 15/16; G10L 15/1815; G10L 15/22; G10L 2015/223
See application file for complete search history.

(56) References Cited

U.S. PATENT DOCUMENTS

| | | |
|---|---|---|
| 2014/0082501 A1 | 3/2014 | Bae et al. |
| 2017/0004828 A1 | 1/2017 | Lee et al. |
| 2017/0124147 A1 | 5/2017 | Bodziony et al. |
| 2018/0060733 A1 | 3/2018 | Beller et al. |
| 2018/0261223 A1 | 9/2018 | Jain et al. |
| 2019/0034542 A1 | 1/2019 | Ming et al. |
| 2019/0188775 A1 | 6/2019 | Rivoli et al. |
| 2019/0198016 A1 | 6/2019 | Mckenzie et al. |
| 2019/0228763 A1 | 7/2019 | Czarnowski et al. |
| 2019/0355043 A1 | 11/2019 | Swierk et al. |
| 2019/0385614 A1 | 12/2019 | Kim et al. |
| 2020/0227030 A1 | 7/2020 | Tan et al. |
| 2021/0064203 A1 | 3/2021 | Yue |
| 2021/0224488 A1 | 7/2021 | Arya et al. |
| 2021/0232768 A1 | 7/2021 | Ling et al. |

# VOICE-ENABLED RECIPE SELECTION

CROSS-REFERENCE TO RELATED APPLICATIONS

The present application is a Continuation Application of U.S. patent application Ser. No. 16/779,535, filed on Jan. 31, 2020, to be issued as U.S. Pat. No. 11,966,964. U.S. patent application Ser. No. 16/779,535 is herewith incorporated by reference in its entirety.

TECHNICAL FIELD

This disclosure relates generally relates to voice-enabled recipe selection.

BACKGROUND

Conventionally, preparing a recipe involves gathering a list containing all of the ingredients and the quantity of each ingredient used to prepare a dish. Generally, items corresponding to the ingredients are packaged in a variety sizes that are standardized by each vendor. Creating an online order using voice commands to order each item and the corresponding size for the ingredient quantity in the recipe can be time-consuming for the user and can expend computer resources.

BRIEF DESCRIPTION OF THE DRAWINGS

To facilitate further description of the embodiments, the following drawings are provided in which.

Figure 1:
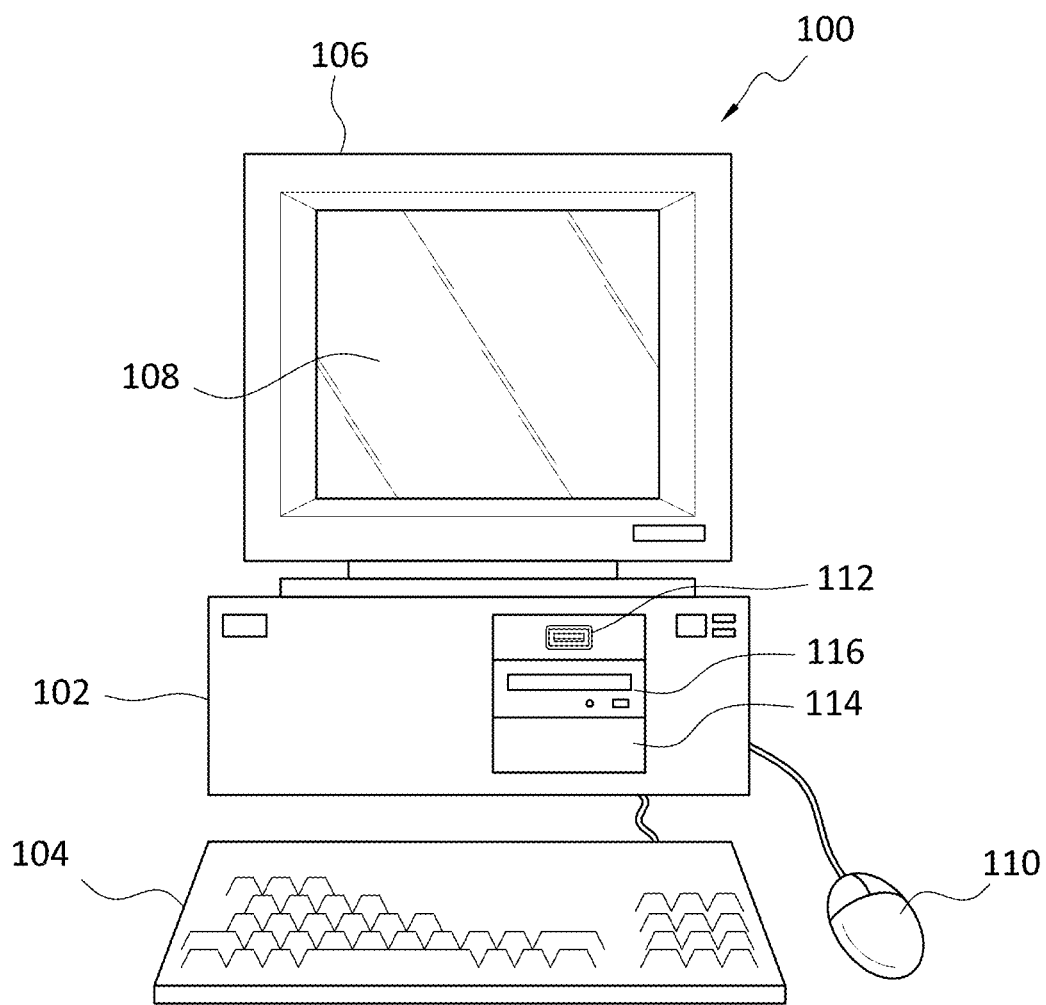
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, or ten seconds.

DESCRIPTION OF EXAMPLES OF EMBODIMENTS

Systems and methods for voice-enabled recipe selection can be used to create online orders. The recipe system can detect an intention from a voice command to locate ingredients for a recipe and automatically add to a cart of an online order the items in the ingredient list, with a suitable size and/or quantity for the items.

Figure 2:
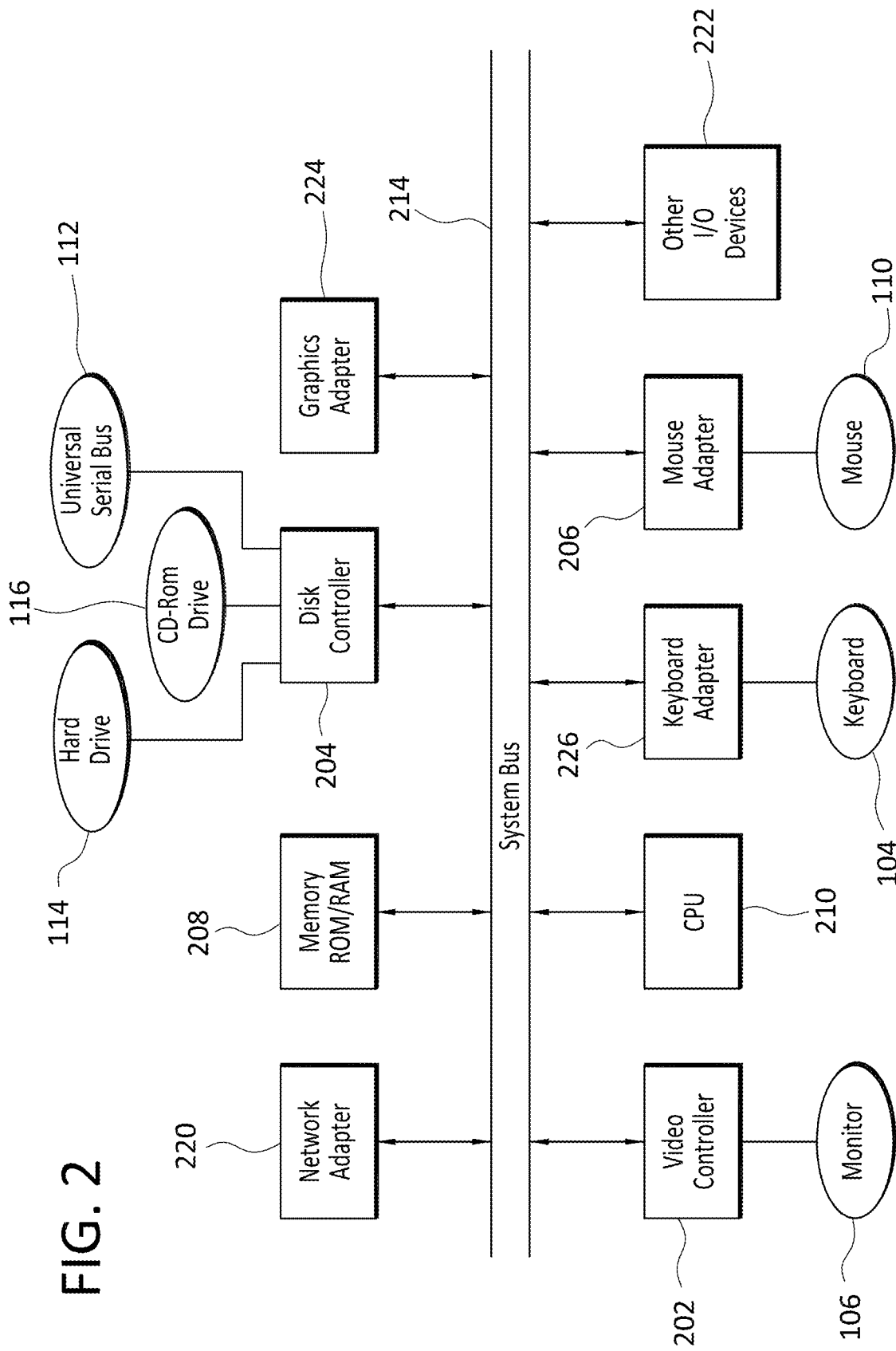
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
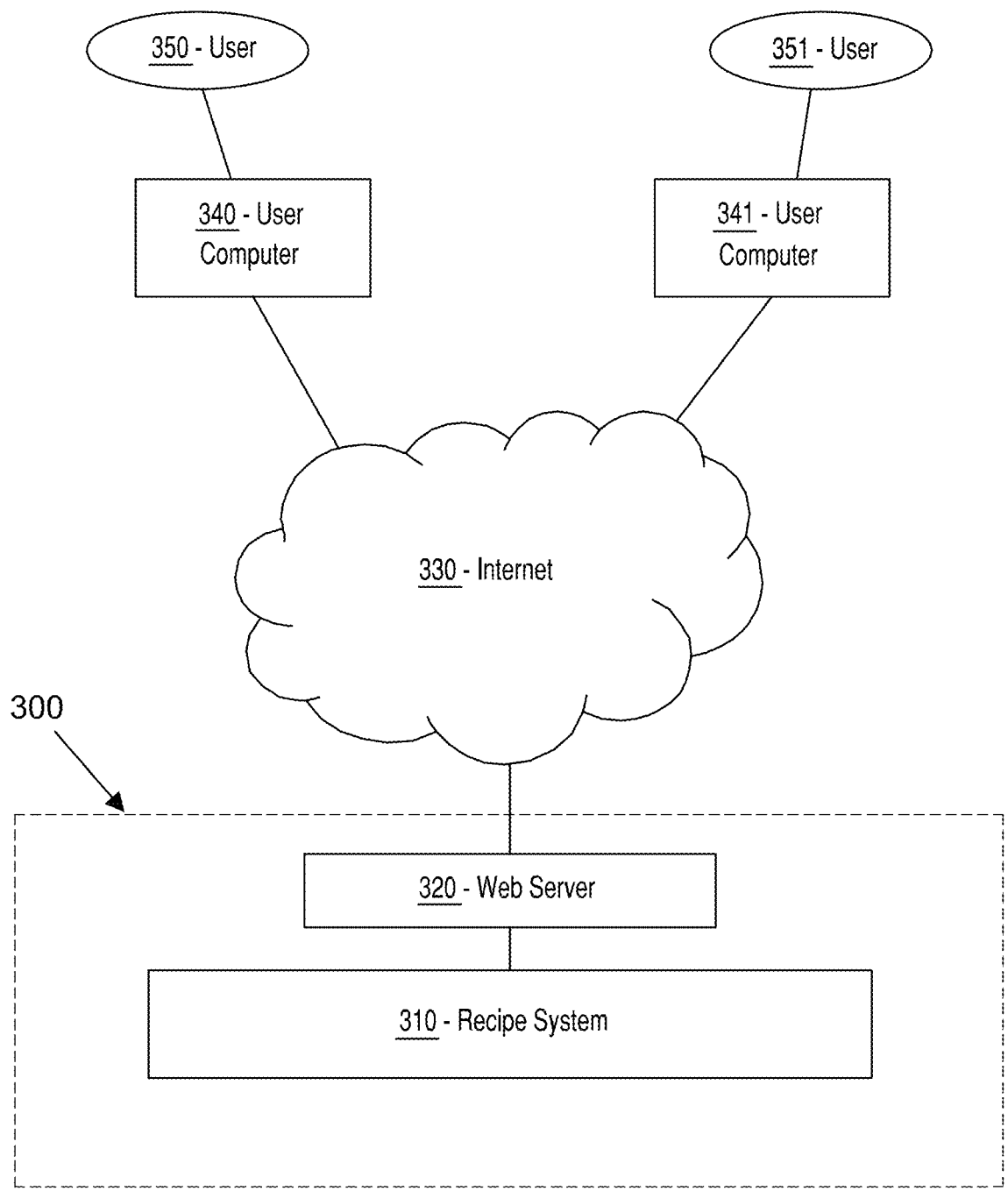
FIG. 3 illustrates a block diagram of a system that can be employed for voice-enabled recipe selection, according to an embodiment.

Turning ahead in the drawings, FIG. 3 illustrates a block diagram of a system 300 that can be employed for voice-enabled selection. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a recipe system 310 and/or a web server 320. Recipe system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, recipe system 310 and/or web server 320. Additional details regarding recipe system 310 and/or web server 320 are described herein.

In a number of embodiments, each of recipe system 310 can be a special-purpose computer programed specifically to perform specific functions not associated with a general-purpose computer, as described in greater detail below.

In some embodiments, web server 320 can be in data communication through Internet 330 with one or more user computers, such as user computers 340 and/or 341. Internet 330 can be a public or private network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities.

In some embodiments, an internal network that is not open to the public can be used for communications between recipe system 310 and/or web server 320 within system 300. Accordingly, in some embodiments recipe system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, recipe system 310 and/or web server 320 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to recipe system 310 and/or web server 320, in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recipe system 310 and/or web server 320. In a similar manner, the processors and/or the non-transitory computer-readable media can be local and/or remote to each other.

Meanwhile, in many embodiments, recipe system 310 and/or web server 320 also can be configured to communicate with and/or include one or more databases and/or other suitable databases. The one or more databases can include an item database that contains information about items (e.g., products) or SKUs (stock keeping units), for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit, or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between recipe system 310 and/or web server 320, and/or the one or more databases, can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In some embodiments, recipe system 310 can be a general-purpose computer or a special-purpose computer programmed to perform specific functions and/or applications. For example, In many embodiments, recipe system 310 can be used by a voice assistant to implement voice commands of a user to search for recipes and corresponding ingredients. In a number of embodiments, recipe system 310 can be used to create and/or add to online orders with the ingredients of a recipe, based on a voice command . . . .

Figure 4:
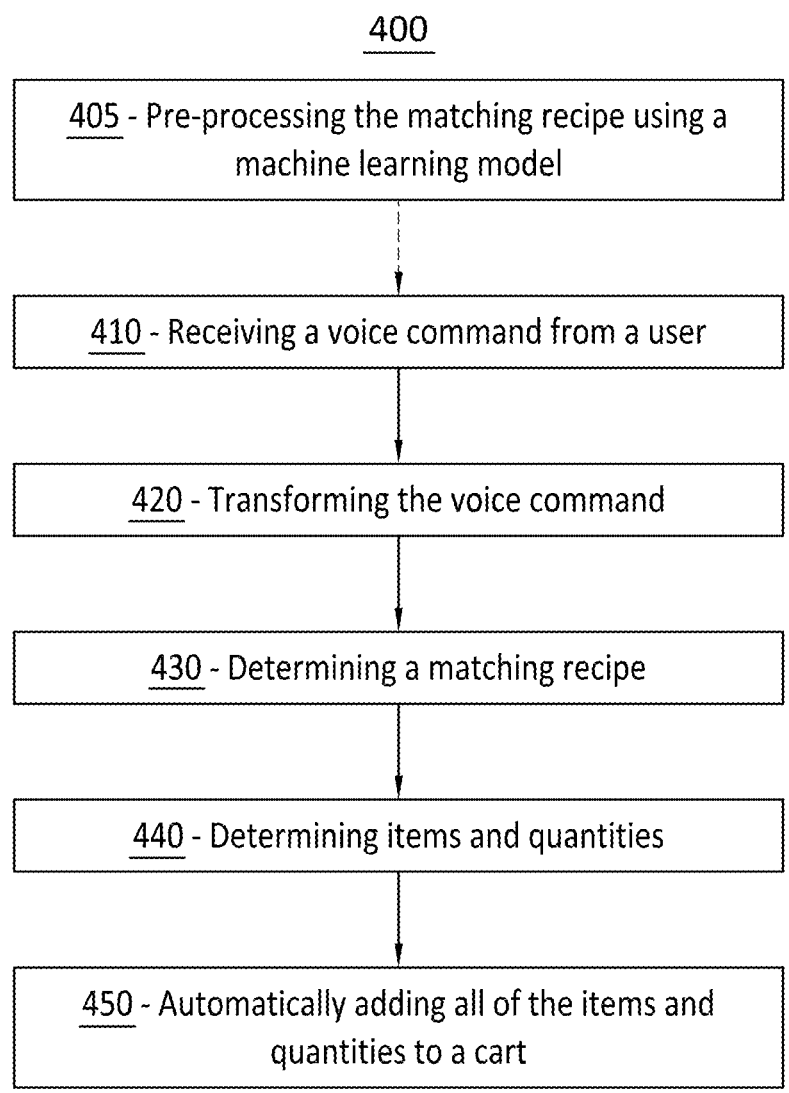
FIG. 4 illustrates a flow chart for a method, according to another embodiment.

Turning ahead in the drawings, FIG. 4 illustrates a flow chart for a method 400, according to another embodiment. In some embodiments, method 400 can be a method of voice-enabled recipe selection. In several embodiments, the recipe and the corresponding list of ingredients can be selected from a set of ingested recipes based on a recipe descriptor. In some embodiments, automatically adding a list of ingredients for a recipe can include determining the quantities associated with each item for each ingredient. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as recipe system 310 and/or web server 320. The processor(s) can be similar or identical to the processor(s) described above with respect to computer system 100 (FIG. 1).

Referring to FIG. 4, method 400 optionally can include a block 405 of pre-processing a plurality of recipes. In many embodiments, pre-processing the plurality of recipes can include pre-processing each recipe of the plurality of recipes, as described below in FIG. 5. In several embodiments, pre-processing the plurality of recipes can occur before the voice command is received from a user. In various embodiments, the plurality of recipes can include more than twenty-five thousand (25,000) recipes.

In some embodiments, method 400 also can include a block 410 of receiving a voice command from a user. The voice command can be similar or identical to voice command 705 (FIG. 7, described below) and/or voice command 801 (FIG. 8, described below). The user can be similar or identical to users 350-351 (FIG. 3). In many embodiments, the voice command from the user can include uttering a recipe shopping intent. For example, a user can utter a voice command that can include a recipe shopping intent, such as "add all ingredients for guacamole." In several embodiments, the voice command can be received from a voice assistant on a user computer (e.g., 340-341) used by the user. For example, the voice assistant can be Amazon Alexa on the Amazon devices (e.g., Amazon Echo), Siri on Apple devices (e.g., iPhone), Google Assistant on Google-enabled devices (e.g., Google Home) and Android devices, Bixby on Samsung devices (e.g., Galaxy), Cortana on Microsoft-enabled devices (e.g., computers running Microsoft Windows OS), and/or other suitable voice assistants. In a number of embodiments, the voice command can be used to detect the recipe shopping intent from the voice command and implement a search for recipes and/or items corresponding to the ingredients of the recipes. In many embodiments, receiving the voice command can include any suitable voice-activated approach for ordering items from an online website.

In various embodiments, method 400 additionally can include a block 420 of transforming the voice command, using a natural language understanding and rules execution engine, into (a) an intent of the user to add recipe ingredients to a cart and (b) a recipe descriptor. In some embodiments, the natural language understanding and rules execution engine can be similar or identical to rules engine 813 (FIG. 8, described below). In many embodiments, the natural language understanding and rules execution engine can tag the voice command as having an intent to perform recipe ingredients shopping. In various embodiments, transforming the voice command can include classifying the intent of the query in the voice command and extracting entities from the voice command, including information about the recipe, such as a recipe descriptor (e.g., a recipe name. In a number of embodiments, the extraction of the intent and/or the recipe descriptor can be performed in real-time after receiving the voice command. For example, if the voice command is "add all ingredients for guacamole," the intent can be an intent to add recipe ingredients to the cart, and the recipe descriptor can be guacamole.

In some embodiments, the transforming can use a template matcher and/or a machine learning model to recognize an intent (e.g., a recipe shopping intent) of the voice command. In several embodiments, implementing training data for the machine learning model can be based on previous voice commands tagged as a recipe shopping intent and input data for the machine learning model can include recipes and recipe-related templates. In some embodiments, the training data can include output data comprising respective indications of whether each voice command intended to include a recipe shopping intent. In many embodiments, the transforming can include translating a recipe descriptor for a recipe from the voice command. In several embodiments, block 420 of transforming the voice command, using a natural language understanding and rules execution engine, into (a) an intent of the user to add recipe ingredients to a cart and (b) a recipe descriptor can include using pattern templates in the natural language understanding and rules execution engine to decipher the intent of the user and the recipe descriptor from the voice command. For example, a pattern template could be "give me all the ingredients for <recipe descriptor>." The voice command can be compared against pattern templates to determine the intent and/or the recipe descriptor.

In a number of embodiments, method 400 also can include a block 430 of determining a matching recipe from a set of ingested recipes based on the recipe descriptor. In many embodiments, determining a matching recipe from a set of ingested recipes can occur upon detection of the intent of the user to add the recipe ingredients to the cart.

In some embodiments, block 430 of determining a matching recipe from a set of ingested recipes can include using a fuzzy matching algorithm with a damerau-levenshtein distance. In various embodiments, the damerau-levenshtein distance can include computing a distance to find the minimum number of operations between two words that are involved in changing one word into the other. In many embodiments, the fuzzy matching algorithm can include elastic search to index the set of ingested recipes. In several embodiments, the fuzzy matching algorithm can determine a matching recipe from the set of ingested recipes. In several embodiments, the fuzzy matching algorithm can determine a matching recipe to the set of ingested recipes, as indexed. In some embodiments, the fuzzy matching algorithm can include matching the recipe descriptor (e.g., recipe name) from the voice command against recipe names (e.g., recipe titles) in a database.

In many embodiments, method 400 additionally can include a block 440 of determining items and quantities associated with the items that correspond to a set of ingredients included in the matching recipe using a quantity inference algorithm. In some embodiments, using the quantity inference algorithm can include searching for an item corresponding to an ingredient on a list to infer a quantity of an ingredient based on the size of the item in the catalog. In many embodiments, using the quantity inference algorithm can include searching for the quantity of the ingredient as listed in the recipe and ordering a size of the corresponding item based on a user preference and/or request.

In several embodiments, block 440 of determining items and quantities associated with the items that correspond to a set of ingredients included in the matching recipe using a quantity inference algorithm can include calculating a closest quantity of an item of the items for the matching recipe. In various embodiments, calculating a closest quantity of an item of the items for the matching recipe can include using the quantity inference algorithm, which can be based on one or more available items in an item catalog. For example, an ingredient for a recipe can include two cups of milk. Based on the quantity inference algorithm, the recipe system 310 (FIG. 3) can order a quart of milk instead of a gallon of milk, unless the user has previously indicated a different preference (e.g., to always order milk by the gallon).

Figure 5:
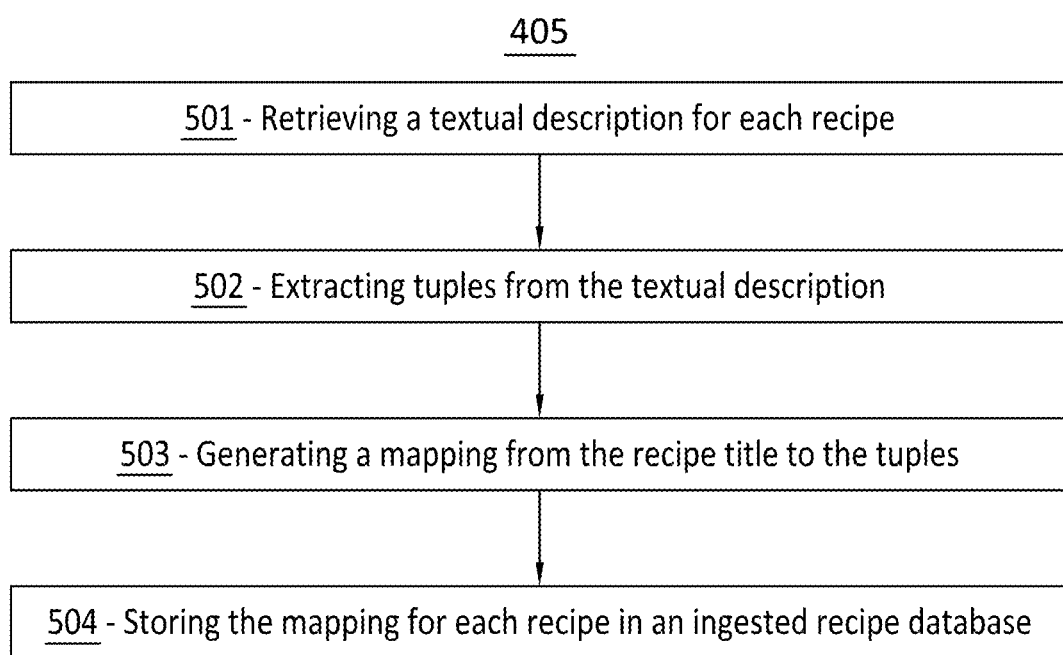
FIG. 5 illustrates a flow chart for a method of block of pre-processing a plurality of recipes, according to the embodiment of FIG. 4.

In a number of embodiments, block 440 of determining items and quantities associated with the items that correspond to a set of ingredients included in the matching recipe using a quantity inference algorithm can include determining the set of ingredients for the matching recipe based on respective tuples for the matching recipe. The tuples can be similar or identical to the tuples generated in block 405 (FIGS. 4-5). In several embodiments, block 440 of determining items and quantities associated with the items that correspond to a set of ingredients included in the matching recipe using a quantity inference algorithm can include determining respective available items in an item catalog that correspond to each item stored in the respective tuples using a search engine. For example, the item can be searched in a search engine for an item catalog of an online store to determine which available items at the store that can be used to satisfy the item. In a number of embodiments, the quantity inference algorithm can use the respective available items to determine a respective closest quantity for the each item. In a number of embodiments, block 440 of determining items and quantities associated with the items that correspond to a set of ingredients included in the matching recipe using a quantity inference algorithm can include calculating a closest quantity of an item of the items for the matching recipe using the quantity inference algorithm based on one or more available items in an item catalog.

In a number of embodiments, method 400 further can include a block 450 of automatically adding all of the items and the quantities associated with the items to a cart. In several embodiments, automatically adding all of the items and quantities for a selected recipe can include receiving an offer identification (ID) and the size of the item to add the identified item to an electronic cart. In some embodiments, receiving the offer ID can be similar to receiving a price tag of the item. In many embodiments, using the offer ID can be implemented by using an alphanumeric token of the item that uniquely identifies an item offered by a retailer (e.g., merchant, vendor). In many embodiments, the items that are added to the cart can be items that were identified as available items in the online catalog in block 440.

Turning ahead in the drawings, FIG. 5 illustrates a flow chart for a block 405 of pre-processing a plurality of recipes, according to another embodiment. Block 405 is merely exemplary and is not limited to the embodiments presented herein. Block 405 can be employed in many different embodiments and/or examples not specifically depicted or described herein. In some embodiments, the procedures, the processes, and/or the activities of block 405 can be performed in the order presented. In other embodiments, the procedures, the processes, and/or the activities of block 405 can be performed in any suitable order. In still other embodiments, one or more of the procedures, the processes, and/or the activities of block 405 can be combined or skipped.

In many embodiments, block 405 can include a block 501 of retrieving a respective textual description for the each recipe. In many embodiments, the recipes can ingested from multiple content sources, such as an online website or a published document. In several embodiments, various online content sources can be data mined to ingest recipes. In several embodiments, ingesting a recipe can include receiving recipe data online in JSON format. In some embodiments, ingesting a recipe can be part of a pre-processing of transforming text from recipes into a standardized format. In several embodiments, block 501 of retrieving a respective textual description for the each recipe can include determining the respective title of the each recipe and respective recipe ingredients of the each recipe, which in a number of embodiments, can be part of ingesting a recipe. In some embodiments, ingesting a recipe can include detecting textual format errors within the list of ingredients, such as by using a string searching algorithm to match one or more characters within a text strings, such as Regular Expressions.

In many embodiments, pre-processing recipe data can include selecting one unit among equivalent units of each ingredient, such as selecting 1 pound of potatoes instead or selecting 450 grams of potatoes to indicate one pound of baking potatoes as an ingredient listed in a recipe.

In several embodiments, pre-processing recipe data can include removing post scripts (e.g., unrelated items mentioned as ingredients in a recipe). In some embodiments, removing post scripts can include removing Unicode characters and/or additional descriptions e.g., (e.g., extra) in each ingredient. For example, post scripts can include such phrases describing an ingredient, such as "available at natural food stores and many supermarkets" or "toppings" or "2 pounds of baking potatoes, thinly sliced" and other suitable post scripts of describing ingredients. In a number of embodiments, removing post scripts from a text string of a line of recipe can include normalizing the text string to identify the item, quantity, size, unit creating date for a tuple of each item corresponding to each ingredient. For example, after removing post scripts from a line of text, the remaining text can include two tablespoons of butter and two pounds of baking potatoes, thinly sliced. By normalizing the text string, the ingredients that can be mapped to corresponding item can include 2 tablespoons of butter and 2 pounds of baking potatoes.

In many embodiments, pre-processing recipe data can include converting quantities listed in one format to a standardized format used for all quantities of each ingredient, such as a fraction to a decimal. For example, convert 2¼ cups of water to 2.25 cups of water.

In various embodiments, block 405 also can include a block 502 of extracting respective tuples from the respective textual description using a machine learning model, as trained. In some embodiments, the respective tuples can represent the respective recipe ingredients for the each recipe, as described below in connection with FIG. 7.

In many embodiments, block 502 of extracting respective tuples from the respective textual description using a machine learning model, as trained, can include using a name entity recognition (NER) model with a Bi-LSTM CRF. In several embodiments, the Bi-LSTM CRF can be a recurrent neural network comprising a combination of a long short-term memory (LSTM) and a conditional random field (CRF). In some embodiments, extracting tuples from textual descriptions can include fetching the attributes of the item using the machine learning model, as trained, can use the NER model with the Bi-LSTM CRF to tag words in the text of an ingredient and extract items, quantities, sizes, and units (e.g., a tuple) from the text of an ingredient in a recipe. In various embodiments, the NER model can identify more than one item in a line of text in a recipe. In several embodiments, fetching the attributes of the item using the machine learning model also can include implementing a cortex machine learning model as a part of a recurrent neural network approach used to extract items and corresponding attributes from the ingredient list. In some embodiments, extracting items from the ingredient list using the cortex machine learning model can include extracting compound words of more than one item used in the same line (e.g., row, text string) in a recipe, such as a teaspoon of salt and pepper.

In many embodiments, each of the respective tuples can include an item, a size, a quantity, and a unit of a respective one of the respective recipe ingredients of the each recipe. In various embodiments, extracting compound words can include determining which item of the compound word can be related to which quantity listed. In a number of embodiments, determining which item of the compound word can be related to which quantity listed can include creating a list of tuples for each recipe using a format for each ingredient that includes: an item, a size, a quantity, and a unit. In various embodiments, determining compound words in a row in a recipe can include broadcasting a previous quantity and unit to each item. For example, a teaspoon of salt and pepper in a line of a recipe can be extracted as a compound word. By using a broadcasting approach using the previous quantity and unit for each item in the compound word, a tuple for each item can be determined. For example, a teaspoon of salt can be converted to a tuple of form (item, size, quantity, unit) as (salt, N/A, 1, teaspoon) indicating salt as the item to order, the size term is not applicable, 1 as the quantity of salt needed for the recipe, and teaspoon as the unit of measure of salt needed for the recipe. A similar tuple can be created for 2 large yellow onions, such as (onion, large, 2, individual), meaning that 2 individual large yellow onions are called for by the recipe.

In some embodiments, block 405 additionally can include a block 503 of generating a respective mapping from the recipe title to the respective tuples of the each recipe, as described below in connection with method 700 in FIG. 7.

In several embodiments, block 405 further can include a block 504 of storing the respective mapping for the each recipe in an ingested recipe database. The ingested recipe database can be similar or identical to recipe database 704 (FIG. 7, described below). In many embodiments, an ingested recipe database can include the set of ingested recipes, including the mappings from the recipe titles to the respective tuples of the recipes.

Figure 6:
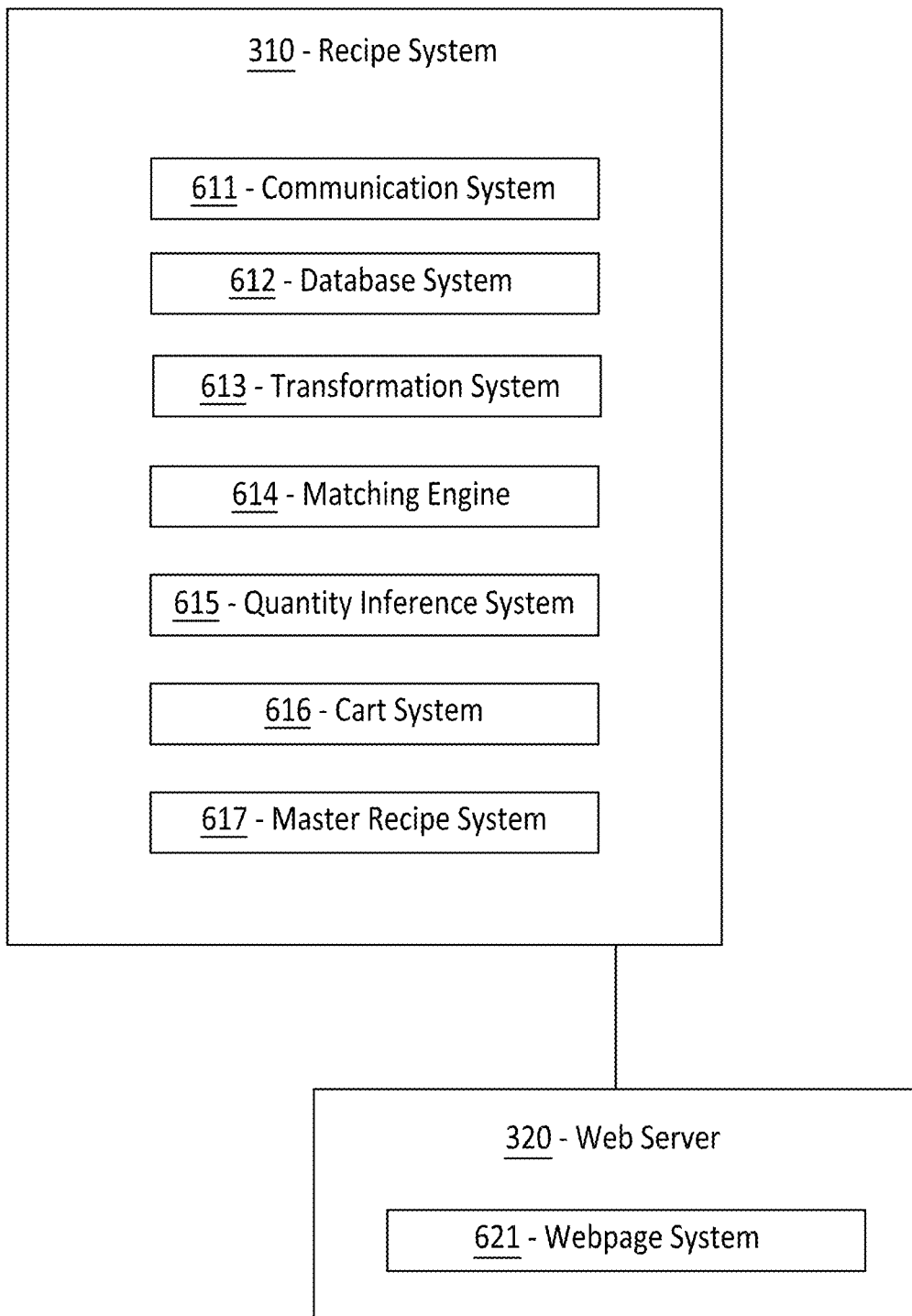
FIG. 6 illustrates a representative block diagram for the system of FIG. 3.

Turning to the next drawing, FIG. 6 illustrates a block diagram of system 300, according to the embodiment shown in FIG. 3. Recipe system 310 and/or web server 320 are merely exemplary and are not limited to the embodiments presented herein. Recipe system 310 and/or web server 320 can be employed in many different embodiments or examples not specifically depicted or described herein. In some embodiments, certain elements or systems of recipe system 310 and/or web server 320 can perform various procedures, processes, and/or acts. In other embodiments, the procedures, processes, and/or acts can be performed by other suitable elements or systems. In many embodiments, the systems of recipe system 310 and/or web server 320 can be modules of computing instructions (e.g., software modules) stored at non-transitory computer readable media. In other embodiments, the systems of recipe system 310 and/or web server 320 can be implemented in hardware.

In many embodiments, recipe system 310 can include a communication system 611. In a number of embodiments, communication system 611 can at least partially perform block 410 (FIG. 4) of receiving a voice command from a user, block 501 (FIG. 5) of retrieving a respective textual description for the each recipe, block 701 (FIG. 7, described below) of receiving a recipe, block 705 (FIG. 7, described below) of receiving a voice command from a user, and/or block 706 (FIG. 7, described below) of transforming the voice command into a recipe shopping intent.

In several embodiments, recipe system 310 also can include a database system 612. In various embodiments, database system 612 can at least partially perform block 430 (FIG. 4) of determining a matching recipe from a set of ingested recipes based on the recipe descriptor, block 504 (FIG. 5) of storing the respective mapping for the each recipe in an ingested recipe database, wherein the set of ingested recipes comprises the plurality of recipes, and/or storing recipes in a recipe database 704 (FIG. 7, described below).

In some embodiments recipe system 310 also can include a transformation system 613. In many embodiments, transformation system 613 can at least partially perform block 420 (FIG. 4) of transforming the voice command, using a natural language understanding and rules execution engine, into (a) an intent of the user to add recipe ingredients to a cart and (b) a recipe descriptor, block 502 (FIG. 5) of extracting respective tuples from the respective textual description using a machine learning model, as trained, and/or block 702 (FIG. 7, described below) of extracting ingredients from a recipe.

In some embodiments recipe system 310 further can include a matching engine 614. In many embodiments, matching engine 614 can at least partially perform block 430

(FIG. 4) of determining a matching recipe from a set of ingested recipes based on the recipe descriptor, block 503 (FIG. 5) of generating a respective mapping from the recipe title to the respective tuples of the each recipe, block 703 (FIG. 7, described below) of mapping recipe names to tuples of items, and/or block 707 (FIG. 7, described below) of looking up a recipe.

In some embodiments recipe system 310 additionally can include a quantity inference system 615. In many embodiments, quantity inference system 615 can at least partially perform block 440 (FIG. 4) of determining items and quantities associated with the items that correspond to a set of ingredients included in the matching recipe using a quantity inference algorithm, block 502 (FIG. 5) of extracting respective tuples from the respective textual description using a machine learning model, as trained, block 708 (FIG. 7, described below) of mapping a list of tuples matching the list of ingredients, and/or block 709 (FIG. 7, described below) of inferring a quantity of an ingredient.

In some embodiments recipe system 310 also can include a cart system 616. In many embodiments, cart system 616 can at least partially perform block 450 (FIG. 4) of automatically adding all of the items and the quantities associated with the items to the cart, and/or block 710 (FIG. 7, described below) of adding a list of items and quantities for a recipe to a cart.

In some embodiments recipe system 310 further can include a master recipe system 617. In many embodiments, master recipe system 617 can at least partially perform block 405 (FIG. 4) of pre-processing a plurality of recipes, block 501 (FIG. 5) of retrieving a respective textual description for the each recipe, block 502 (FIG. 5) of extracting respective tuples from the respective textual description using a machine learning model, as trained, block 503 (FIG. 5) of generating a respective mapping from the recipe title to the respective tuples of the each recipe, and/or block 504 (FIG. 5) of storing the respective mapping for the each recipe in an ingested recipe database.

In several embodiments, web server 320 can include a webpage system 621. Webpage system 621 can at least partially perform sending instructions to user computers (e.g., 350-351 (FIG. 3)) based on information received from communication system 611, and/or receiving instructions from the user computers.

Figure 7:
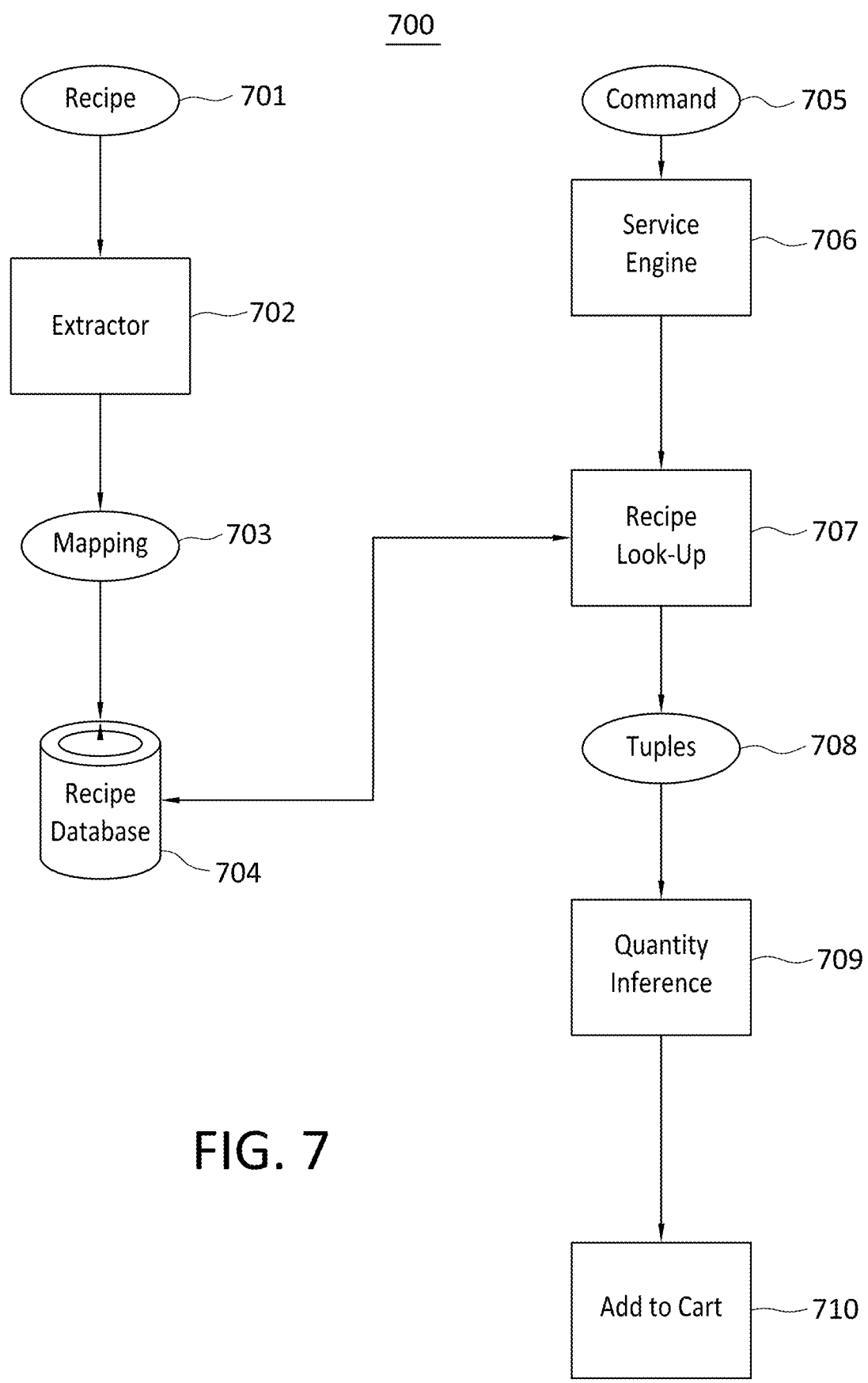
FIG. 7 illustrates a flow chart for a method, according to another embodiment.
Figure 8:
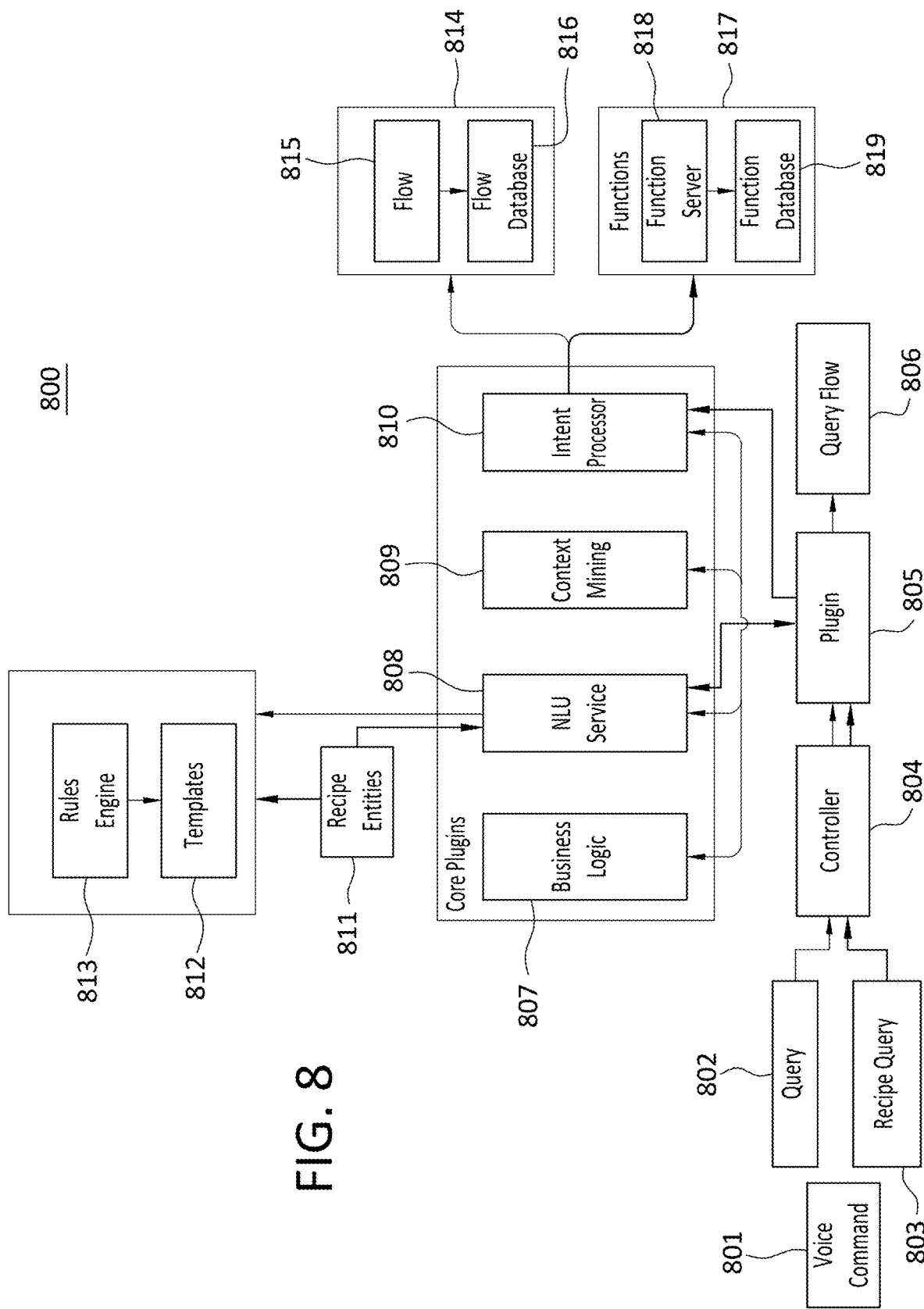
FIG. 8 illustrates a block diagram of a system, showing a flow of data between elements of the system, according to another embodiment.

Turning ahead in the drawings, FIG. 7 illustrates a flow chart of method 700, according to another embodiment. Method 700 can be similar to method 500 (FIG. 5), and various procedures, processes, and/or activities of method 700 can be similar or identical to various procedures, processes, and/or activities of method 500 (FIG. 5). Method 700 can be employed in many different embodiments and/or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In several embodiments, system 300 (FIG. 3) can be suitable to perform method 700 and/or one or more of the activities of method 700.

In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as recipe system 310 and/or web server 320. The processor(s) can be similar or identical to the processor(s) described above with respect to computer system 100 (FIG. 1).

Referring to FIG. 7, in various embodiments, method 700 can include a block 701 of receiving a recipe. In many embodiments, receiving the recipe can include sourcing the recipe from multiple content sources, such as an online website or a published document, similarly as implemented in block 501 (FIG. 5).

In several embodiments, method 700 also can include a block 702 of extracting ingredients from a recipe. In some embodiments, extracting ingredients can include using a machine learning model, as trained, such as BiLSTM CRF to tag text strings and extract corresponding quantities, sizes, and units from text strings, similarly as implemented in block 502 (FIG. 5).

In many embodiments, method 700 additionally can include a block 703 of mapping recipe names to tuples of items. In many embodiments, the tuple of an item corresponding to an ingredient of a recipe can include an item, size, quantity, and/or unit. The mappings can be similar to the mappings generated in block 503 (FIG. 5).

In some embodiments, method 700 further can include storing recipes in a recipe database 704, similarly as implemented in block 504 (FIG. 5). In many embodiments blocks 701-704 can be pre-processing that is performed offline before receiving online processing described in blocks 705-710, below.

In various embodiments, method 700 also can include a block 705 of receiving a voice command from a user, similarly as received in block 410 (FIG. 4) and/or as shown in block 801 (FIG. 8, described below).

In a number of embodiments, method 700 additionally can include a block 706 of transforming the voice command into a recipe shopping intent, similarly as shown in block 420 (FIG. 4) and/or blocks 808 and 810 (FIG. 8, described below).

In some embodiments, method 700 further can include a block 707 of looking up a recipe. In many embodiments, block 707 can include using a fuzzy matching algorithm to match the recipe descriptor in the voice command against the recipe names (e.g., titles) in recipe database 704, as similarly used in block 430 (FIG. 4).

In several embodiments, method 700 also can include a block 708 of obtaining a list of tuples matching for the recipe that matched the recipe descriptor, which can be a structure form that represents the list of ingredients in the recipe. In some embodiments, the list of tuples can be received from the list of tuples to which the recipe name is matched in recipe database 704.

In many embodiments, method 700 additionally can include a block 709 of inferring a quantity of an ingredient. In various embodiments, inferring the quantity of an ingredient can be based on an actual size of the item. In some embodiments, inferring the quantity of an ingredient can be based on a user preference (e.g., personalization) and/or a request from the user for a quantity of the item to add to a cart. In some embodiments, inferring the quantity of the item for an ingredient can include searching for the item in the list of ingredients using a search engine, such as an elastic search. For example, for a tuple that represents the 1 teaspoon of salt, the quantity inference algorithm can infer that a 10 ounce jar of salt is the closest available item in the item catalog.

In various embodiments, method 700 also can include a block 710 of adding the list of items and quantities for the recipe to a cart, such as an electronic cart. In some embodiments, adding a list of items to a cart can include using a second thread (e.g., thread of execution) to locate the items corresponding to ingredients while a user continues to use voice commands to order other items using a first thread. In many embodiments, using voice commands to order items can include executing more than one thread when implementing a program by dividing the program into to two or more simultaneously running tasks that do not interfere with each other.

Turning ahead in the drawings, FIG. 8 illustrates a block diagram of a system 800 showing a flow of data between elements of system 800, according to another embodiment. System 800 is merely exemplary, and embodiments of the system are not limited to the embodiments presented herein. The system can be employed in many different embodiments or examples not specifically depicted or described herein. In some embodiments, certain elements, modules, or systems of system 800 can perform various procedures, processes, and/or activities. In other embodiments, the procedures, processes, and/or activities can be performed by other suitable elements, modules, or systems of system 800. System 800 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 800 described herein. In some embodiments, system 800 can be an implementation of recipe system 310 (FIG. 3).

In many embodiments, system 800 can receive a voice command 801 of a user creating an online order. In some cases, voice command 801 can be a query 802, such as a non-recipe query to order an item. In many embodiments, query 802 can be processed through a controller on a first thread used for interacting with an online website and/or a voice assisted agent. In other cases, voice command 801 can be a recipe query 803, such as a request to add the items from a recipe into the cart. In many embodiments, recipe query 803 can be processed through the controller on a second thread used for interacting with an online website and/or a voice assisted agent.

In various embodiments, system 800 additionally can include a controller 804, which can receive voice command 801, such as query 802 or recipe query 803. In a number of embodiments, system 800 also can include a plugin system 805, which can receive information about query 802 and/or recipe query 803 from controller 804. In a number of embodiments, plugin system 805 can include various plugins, such as a business logic system 807, a NLU (natural language understanding) service 808, a context mining system 809, an intent processor system 810, and/or other suitable plugins.

In many embodiments, business logic system 807 can perform converting speech into text, such as by using automatic speech recognition (ASR).

In several embodiments, NLU service 808 can recognize the recipe shopping intent from the voice command (e.g., 801). In several embodiments, once the NLU service 808 recognizes and tags the voice command as having a recipe shopping intent, NLU service 808 can divert the request to locate the recipe and the ingredients using the second thread. If the voice command (e.g., 801) is a query command (e.g., non-recipe intent), then the first thread can be used for further processing. In many embodiments, NLU service 808 can call a rules engine 813 to determine the intent and/or one or more entities (e.g., the recipe descriptor), which can be returned as recipe entities 811. In many embodiments, rules engine 813 can use one or more templates 812, such as the pattern templates described above, to extract the intent and/or recipe descriptor. For non-recipe intent queries (e.g., query 802), the intent can be different than a recipe intent. In various embodiments, rules engine 813 can be used to perform searching for the recipe in the recipe database. In many embodiments, searching for the recipe in the recipe database can include searching recipe related templates and rules in the recipe database.

In various embodiments, context mining system 809 can be used from a voice command using the first thread to determine the context of the query (e.g., 802). In many embodiments, context mining system 809 is not used for the second thread when the recipe intent has been determined.

In a number of embodiments, intent processing system 810 can determine where to route the information, based on an intent of the voice command (e.g., 801). In many embodiments, for a non-recipe intent, such as ordering an item, the query (e.g., 802), and/or information extracted therefrom, can be routed to a task flow executor 814, in a first thread. When the intent is a recipe intent, the recipe query (e.g., 803), and/or information extracted therefrom, can be routed to a recipe function executor 817, in a second thread. In some embodiments, the query for an online order and the recipe query for a ingredients for a recipe can include sharing the same cart, such as an electronic cart for the user, using the first thread and the second thread concurrently.

In some embodiments, system 800 further can include a query flow system 806, which can be used to implement the query (e.g., 802) on the first thread.

In several embodiments, task flow executor 814 can include using the first thread. In a number of embodiments, task flow executor 814 can include a flow engine 815 and/or a flow database 816. In some embodiments, flow engine 815 can perform executing a query flow of orders from the voice commands for non-recipe intents. In several embodiments, executing a query flow of orders from the voice commands can include using the first thread. In some embodiments, flow database 816 can perform storing the query flow of orders (e.g., adding items to a cart), which can be performed using the first thread.

In many embodiments, recipe function executor 817 can perform implementing a recipe function flow. In various embodiments, implementing a recipe function flow can be performed using the second thread. In several embodiments, recipe function executor 817 can include a function server 818 and/or a function database 819. In several embodiments, recipe function executor 817 can perform determining a matching recipe and the items and quantities to add to the cart, similar as shown in blocks 430, 440 and/or 450 (FIG. 4). In some embodiments, executing a recipe add on feature can be performed using the second thread. In various embodiments, function database 819 can be a database used to store the recipes, such as recipe database 704 (FIG. 7), which can be used to lookup the recipe and/or ingredients, such as determining the matching recipes and the tuples for the ingredients. In various embodiments, looking up recipe ingredients in a recipe database can be performed using the second thread.

Conventionally, online shopping using voice commands uses a single multitasking operating system running different processes. An advantage of using the recipe system can include splitting the program into at least two threads running simultaneously that share the same resources.

Receiving a voice command to order items online can be processed to run on a first thread. When a recipe shopping intent is identified from the voice command, the recipe system can divert the request for ingredients of a recipe to the second thread running simultaneously with the first thread allowing the first thread to remain lightweight and independent to run other computer processes indicating an improvement over conventional voice activated online shopping approaches and/or techniques.

In many embodiments, the techniques described herein can provide several technological improvements. In some embodiments, the techniques described herein can provide for automatically identifying an intent of the user by a voice command, automatically matching a recipe recited in the voice command to a database with pre-processed recipes, and determining corresponding item and quantities to add to a cart based on a voice command. In many embodiments, the techniques described herein can beneficially make add items to the cart that correspond to a recipe in real-time, based on pre-processing that ingested a list of tuples of ingredients for a requested recipe. In various embodiments, matching a recipe and determining one or more items to add to a cart from a voice command in real-time for users, such as users 350-351 (FIG. 3), can beneficially result in a reduction in processor use and memory cache.

In a number of embodiments, the techniques described herein can advantageously provide a consistent user experience by dynamically providing a technique that creates a list of ingredients for a request recipe and adds the corresponding items and sizes from an item catalog to an electronic cart using a single voice command. In some embodiments, the techniques provided herein can beneficially reduce computing resources and costs while offering real-time processing for online orders received from voice commands. For example, an online catalog for a large retail store can include over eight million (8,000,000) items at any given time.

In many embodiments, the techniques described herein can be used continuously at a scale that cannot be handled using manual techniques. Additionally, pre-processing recipes from multiple content sources can include transforming over twenty-five million recipes into a uniform format and creating tuples for each ingredient in a recipe. In many embodiments, once a recipe is identified, the system can map each tuple to corresponding items in respective sizes matching the unit of an ingredient for the recipe from a catalog. For example, the number of daily and/or monthly visits to the an online website to order items via a voice assistant can exceed approximately two million (2,000,000) visits each day.

In a number of embodiments, the techniques described herein can solve a technical problem that arises only within the realm of computer networks, as determining a request to add ingredients for a recipe to a virtual cart from a voice command does not exist outside the realm of computer networks. Moreover, the techniques described herein can solve a technical problem that cannot be solved outside the context of computer networks. Specifically, the techniques described herein cannot be used outside the context of computer networks, in view of a machine learning model, as trained, and because an item catalog, such as an online catalog, that can power and/or feed an online website, of the techniques described herein would not exist.

Various embodiments can include a system. A system can include one or more processors and one or more non-transitory computer-readable media storing computing instructions configured to run on the one or more processors and perform certain acts. The acts can include receiving a voice command from a user. The acts also can include transforming the voice command. Transforming the voice command can include using a natural language understanding and rules execution engine into (a) an intent of the user to add recipe ingredients to a cart and (b) a recipe descriptor. Upon detection of the intent of the user to add the recipe ingredients to the cart, the acts further can include determining a matching recipe from a set of ingested recipes based on the recipe descriptor. The acts additionally can include determining items and quantities associated with the items that correspond to a set of ingredients included in the matching recipe using a quantity inference algorithm. The acts also can include automatically adding all of the items and the quantities associated with the items to the cart.

Several embodiments can include a method. The method can be implemented via execution of computing instructions configured to run at one or more processors and stored at one or more non-transitory computer-readable media. The method can include receiving a voice command from a user. The method also can include transforming the voice command. Transforming a voice command can include using a natural language understanding and rules execution engine into (a) an intent of the user to add recipe ingredients to a cart and (b) a recipe descriptor. Upon detection of the intent of the user to add the recipe ingredients to the cart, the method further can include determining a matching recipe from a set of ingested recipes based on the recipe descriptor. The method additionally can include determining items and quantities associated with the items that correspond to a set of ingredients included in the matching recipe using a quantity inference algorithm. The method also can include automatically adding all of the items and the quantities associated with the items to the cart.

A number of embodiments can include a system that can include one or more processors and one or more non-transitory computer-readable media storing computing instructions that, when executed configured to run on the one or more processors, cause the one or more processors to and perform certain acts. The acts can include receiving a command from a user. The acts also can include transforming, using a trained machined learning model, the command by detecting an intent to add one or more recipe ingredients to a shopping cart. The acts further can include determining a recipe from a set of recipes based on the one or more recipe ingredients. The acts additionally can include determining one or more items and one or more quantities or sizes of the one or more items corresponding to a set of ingredients of the recipe. For each ingredient of the set of ingredients that corresponds to the one or more recipe ingredients, the acts also can include selecting a respective quantity or size from quantities or sizes of available items of the one or more items based on a closest quantity or size of each ingredient. The respective quantity or size, as selected, can be overruled when a different quantity or size preference is indicated by the user. The acts further can include automatically adding to the shopping cart all of the respective quantities or sizes of the one or more items corresponding to the one or more recipe ingredients.

Various embodiments include a method implemented via execution of computing instructions configured to run at one or more processors and stored at one or more non-transitory computer-readable media. The method can include receiving a command from a user. The method also can include transforming, using a trained machined learning model, the command by detecting an intent to add one or more recipe ingredients to a shopping cart. The method further can include determining a recipe from a set of recipes based on the one or more recipe ingredients. The method additionally can include determining one or more items and one or more quantities or sizes of the one or more items corresponding to a set of ingredients of the recipe. For each ingredient of the set of ingredients that corresponds to the one or more recipe ingredients, the method also can include selecting a respective quantity or size from quantities or sizes of available items of the one or more items based on a closest quantity or size of each ingredient. The respective quantity or size, as selected, can be overruled when a different quantity or size preference is indicated by the user. The method further can include automatically adding to the shopping cart all of the respective quantities or sizes of the one or more items corresponding to the one or more recipe ingredients.

Although voice-enabled recipe selection has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4-5 and 7-8 may include different procedures, processes, and/or activities and be performed by many different modules, in many different orders, and/or one or more of the procedures, processes, or activities of FIGS. 4-5 and 7-8 may include one or more of the procedures, processes, or activities of another different one of FIGS. 4-5 and 7-8. As another example, the systems within recipe system 310 and/or webserver 320 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed:

1. A system comprising:
one or more processors; and
one or more non-transitory computer-readable media storing computing instructions that, when executed configured to run on the one or more processors, cause the one or more processors to perform operations comprising:
receiving a command from a user;
transforming, using a trained machine learning model, the command by detecting an intent to add one or more recipe ingredients to a shopping cart;
determining a recipe from a set of recipes based on the one or more recipe ingredients;
determining one or more items and one or more quantities or sizes of the one or more items corresponding to a set of ingredients of the recipe;
for each ingredient of the set of ingredients that corresponds to the one or more recipe ingredients, selecting a respective quantity or size from quantities or sizes of available items of the one or more items based on a closest quantity or size of each ingredient, wherein the respective quantity or size, as selected, is overruled when a different quantity or size preference is indicated by the user; and
automatically adding to the shopping cart all of the respective quantities or sizes of the one or more items corresponding to the one or more recipe ingredients.

2. The system of claim 1, wherein:
receiving the command further comprises:
receiving the command via a mobile device of the user, wherein the command comprises text;
transforming the command further comprises:
extracting entities from the command comprising a recipe descriptor; and
determining the recipe further comprises:
translating, using the trained machine learning model, the recipe descriptor into the recipe.

3. The system of claim 1, wherein the operations further comprise:
pre-processing each recipe of a plurality of recipes by:
retrieving a respective textual description for each recipe;
extracting, using a trained machine learning model, respective tuples from the respective textual description, wherein the respective tuples represent respective recipe ingredients for each recipe;
generating a respective mapping from a respective title of each recipe to the respective tuples of each recipe; and
storing the respective mapping for each recipe in an ingested recipe database.

4. The system of claim 3, wherein:
each of the respective tuples further comprises an item, a size, a quantity, or a unit of a respective one of the respective recipe ingredients for each recipe.

5. The system of claim 1, wherein determining the one or more items and the one or more quantities or sizes of the one or more items further comprises:
determining the set of ingredients for a matching recipe based on respective tuples for the matching recipe.

6. The system of claim 5, wherein determining the one or more items and the one or more quantities or sizes of the one or more items further comprises:
determining, using a search engine, available items in an item catalog that correspond to each item stored in the respective tuples.

7. The system of claim 6, wherein determining the one or more items and the one or more quantities or sizes of the one or more items further comprise:
calculating the closest quantity or size of an item of the one or more items for the matching recipe using a quantity inference algorithm based on one or more available items in the item catalog.

8. The system of claim 1, wherein determining the recipe further comprises:
    determining the recipe from a set of ingested recipes and using a fuzzy matching algorithm with a damerau-levenshtein distance.

9. The system of claim 8, wherein:
    the fuzzy matching algorithm uses elastic search to index the set of ingested recipes; and
    the fuzzy matching algorithm matches a matching recipe to the set of ingested recipes, as indexed.

10. The system of claim 1, wherein:
    the machine learning model comprises:
        a template matcher, a natural language understanding, and a rules execution engine; and
    transforming the command further comprises:
        using the template matcher, the natural language understanding, and the rules execution engine to compare pattern templates to detect from the command (i) the intent of the user and (ii) a recipe descriptor.

11. A method being implemented via execution of computing instructions configured to run at one or more processors and stored at one or more non-transitory computer-readable media, the method comprising:
    receiving a command from a user;
    transforming, using a trained machine learning model, the command by detecting an intent to add one or more recipe ingredients to a shopping cart;
    determining a recipe from a set of recipes based on the one or more recipe ingredients;
    determining one or more items and one or more quantities or sizes of the one or more items corresponding to a set of ingredients of the recipe;
    for each ingredient of the set of ingredients that corresponds to the one or more recipe ingredients, selecting a respective quantity or size from quantities or sizes of available items of the one or more items based on a closest quantity or size of each ingredient, wherein the respective quantity or size, as selected, is overruled when a different quantity or size preference is indicated by the user; and
    automatically adding to the shopping cart all of the respective quantities or sizes of the one or more items corresponding to the one or more recipe ingredients.

12. The method of claim 11 further comprising:
    receiving the command further comprises:
        receiving the command via a mobile device of the user, wherein the command comprises text;
    transforming the command further comprises:
        extracting entities from the command comprising a recipe descriptor; and
    determining the recipe further comprises:
        translating, using the trained machine learning model, the recipe descriptor into the recipe.

13. The method of claim 12 further comprising:
    pre-processing each recipe of a plurality of recipes by:
        retrieving a respective textual description for each recipe;
        extracting, using a trained machine learning model, respective tuples from the respective textual description, wherein the respective tuples represent respective recipe ingredients for each recipe;
        generating a respective mapping from a respective title of each recipe to the respective tuples of each recipe; and
        storing the respective mapping for each recipe in an ingested recipe database.

14. The method of claim 13, wherein:
    each of the respective tuples further comprises an item, a size, a quantity, or a unit of a respective one of the respective recipe ingredients for each recipe.

15. The method of claim 11, wherein determining the one or more items and the one or more quantities or sizes of the one or more items further comprises:
    determining the set of ingredients for a matching recipe based on respective tuples for the matching recipe.

16. The method of claim 15, wherein determining the one or more items and the one or more quantities or sizes of the one or more items further comprises:
    determining, using a search engine, available items in an item catalog that correspond to each item stored in the respective tuples.

17. The method of claim 16, wherein determining the one or more items and the one or more quantities or sizes of the one or more items further comprise:
    calculating the closest quantity or size of an item of the one or more items for the matching recipe using a quantity inference algorithm based on one or more available items in the item catalog.

18. The method of claim 11, wherein determining the recipe further comprises:
    determining the recipe from a set of ingested recipes and using a fuzzy matching algorithm with a damerau-levenshtein distance.

19. The method of claim 18, wherein:
    the fuzzy matching algorithm uses elastic search to index the set of ingested recipes; and
    the fuzzy matching algorithm matches a matching recipe to the set of ingested recipes, as indexed.

20. The method of claim 11, wherein:
    the machine learning model comprises:
        a template matcher, a natural language understanding, and a rules execution engine; and
    transforming the command further comprises:
        using the template matcher, the natural language understanding, and the rules execution engine to compare pattern templates to detect from the command (i) the intent of the user and (ii) a recipe descriptor.

* * * * *